US012659017B2

(12) United States Patent
Esswie

(10) Patent No.: US 12,659,017 B2
(45) Date of Patent: Jun. 16, 2026

(54) SEMI-STATIC NON-TERRESTRIAL NETWORK DISCOVERY

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 211 days.

(21) Appl. No.: 18/493,702

(22) Filed: Oct. 24, 2023

(65) Prior Publication Data

US 2025/0132812 A1    Apr. 24, 2025

(51) Int. Cl.
*H04B 7/185* (2006.01)
(52) U.S. Cl.
CPC ................................. *H04B 7/18513* (2013.01)
(58) Field of Classification Search
None
See application file for complete search history.

(56) References Cited

U.S. PATENT DOCUMENTS

| | | | | |
|---|---|---|---|---|
| 2013/0070615 A1* | 3/2013 | Lennartson | ....... | H04W 52/0206 |
| | | | | 370/242 |
| 2020/0084747 A1* | 3/2020 | Hong | .................... | H04W 72/23 |
| 2021/0083760 A1 | 3/2021 | Schmidt et al. | | |
| 2021/0092781 A1* | 3/2021 | Lauridsen | ............. | H04W 24/02 |
| 2024/0357707 A1* | 10/2024 | Yau | ......................... | H04W 4/90 |
| 2025/0193828 A1* | 6/2025 | Shen | ..................... | H04W 64/00 |

FOREIGN PATENT DOCUMENTS

EP        4 175 351        5/2023

OTHER PUBLICATIONS

International Search Report and Written Opinion for PCT Application No. PCT/US2024/013878 mailed Aug. 21, 2024, 16 pages.
Notification Concerning Transmittal of International Preliminary Report on Patentability mailed May 7, 2026 for PCT Application No. PCT/US2024/013878, 10 pages.

* cited by examiner

*Primary Examiner* — Adolf Dsouza
(74) *Attorney, Agent, or Firm* — Amin, Turocy & Watson, LLP

(57)        ABSTRACT

A user equipment may receive a discovery signal broadcast by a non-terrestrial radio node. The user equipment may determine a coverage level based on the discovery signal and may transmit the coverage level and other coverage level information in a discovery signal coverage level report to a terrestrial radio node. The terrestrial node may receive coverage level information from another terrestrial node. The terrestrial node may transmit an expected coverage level, based on coverage level information corresponding to the non-terrestrial node, to the user equipment in an expected coverage level report. The non-terrestrial node may halt transmission of the discovery signal during a discovery signal deactivation period. The user equipment may use the expected coverage level, and other information, received in the expected coverage level report to communicate with the non-terrestrial node during the deactivation period.

20 Claims, 12 Drawing Sheets

300

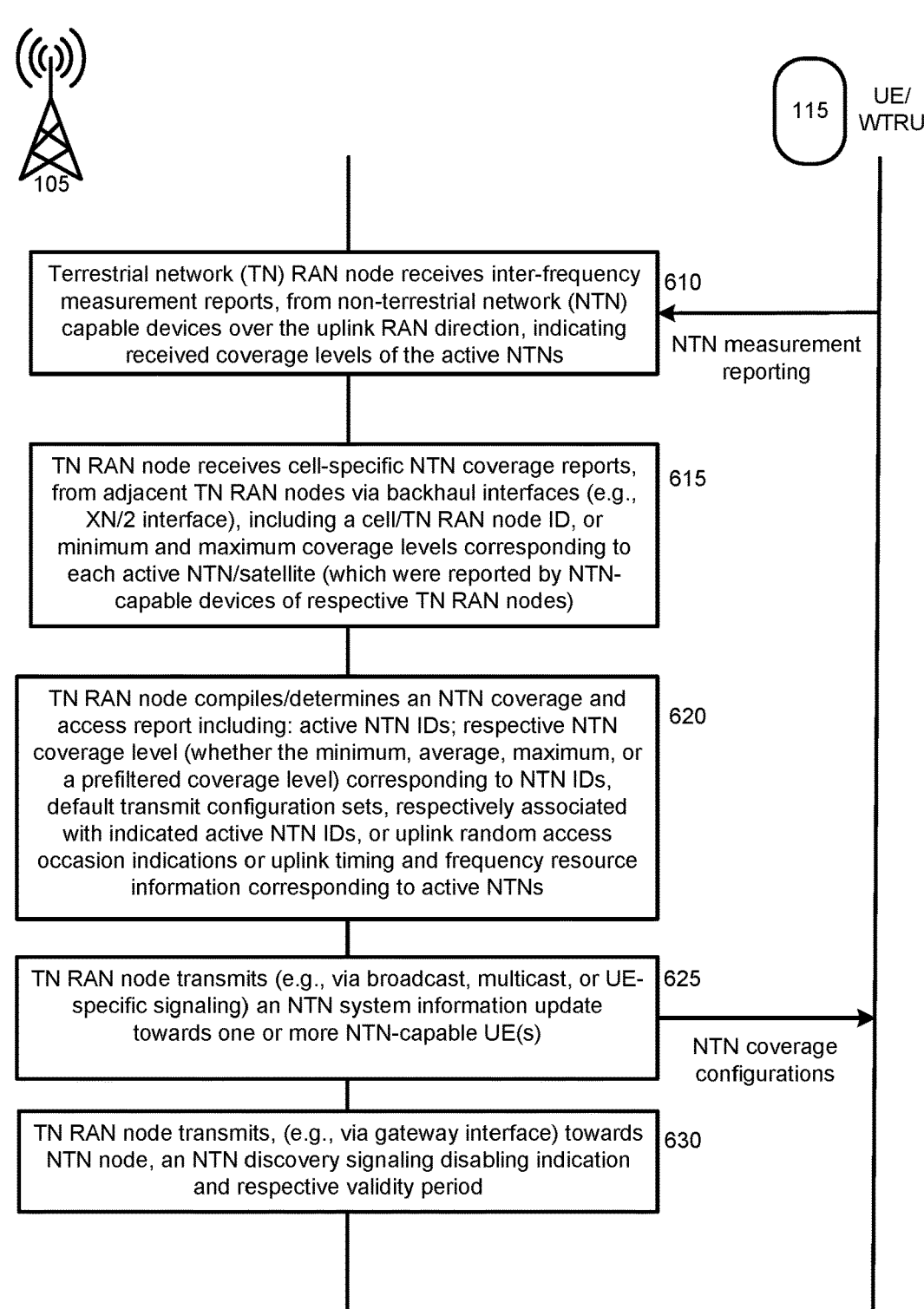

105

115   UE/ WTRU

Terrestrial network (TN) RAN node receives inter-frequency measurement reports, from non-terrestrial network (NTN) capable devices over the uplink RAN direction, indicating received coverage levels of the active NTNs   610

NTN measurement reporting

TN RAN node receives cell-specific NTN coverage reports, from adjacent TN RAN nodes via backhaul interfaces (e.g., XN/2 interface), including a cell/TN RAN node ID, or minimum and maximum coverage levels corresponding to each active NTN/satellite (which were reported by NTN-capable devices of respective TN RAN nodes)   615

TN RAN node compiles/determines an NTN coverage and access report including: active NTN IDs; respective NTN coverage level (whether the minimum, average, maximum, or a prefiltered coverage level) corresponding to NTN IDs, default transmit configuration sets, respectively associated with indicated active NTN IDs, or uplink random access occasion indications or uplink timing and frequency resource information corresponding to active NTNs   620

TN RAN node transmits (e.g., via broadcast, multicast, or UE-specific signaling) an NTN system information update towards one or more NTN-capable UE(s)   625

NTN coverage configurations

TN RAN node transmits, (e.g., via gateway interface) towards NTN node, an NTN discovery signaling disabling indication and respective validity period   630

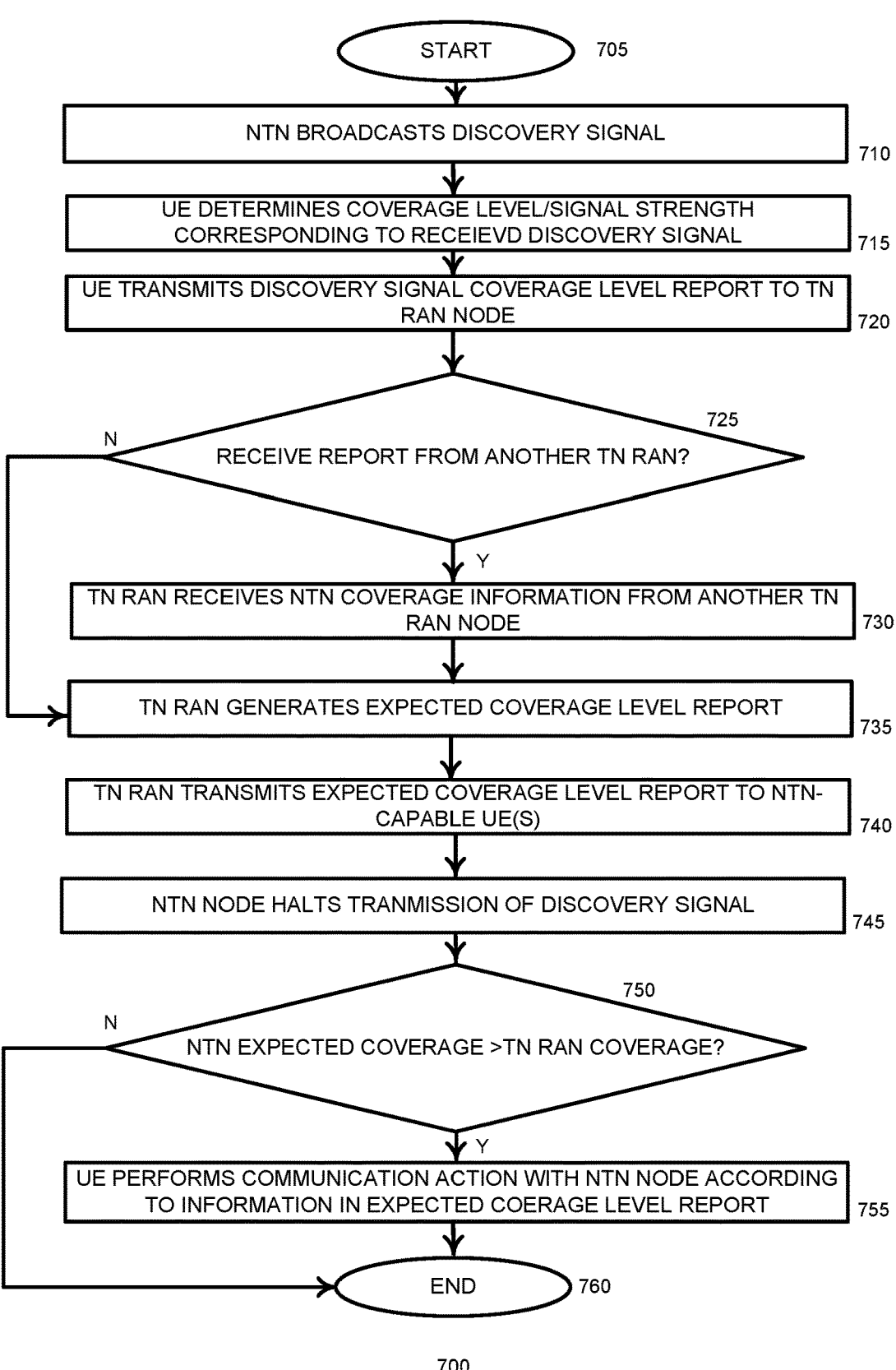

START — 705

NTN BROADCASTS DISCOVERY SIGNAL — 710

UE DETERMINES COVERAGE LEVEL/SIGNAL STRENGTH CORRESPONDING TO RECEIEVD DISCOVERY SIGNAL — 715

UE TRANSMITS DISCOVERY SIGNAL COVERAGE LEVEL REPORT TO TN RAN NODE — 720

RECEIVE REPORT FROM ANOTHER TN RAN? — 725
N
Y

TN RAN RECEIVES NTN COVERAGE INFORMATION FROM ANOTHER TN RAN NODE — 730

TN RAN GENERATES EXPECTED COVERAGE LEVEL REPORT — 735

TN RAN TRANSMITS EXPECTED COVERAGE LEVEL REPORT TO NTN-CAPABLE UE(S) — 740

NTN NODE HALTS TRANMISSION OF DISCOVERY SIGNAL — 745

NTN EXPECTED COVERAGE >TN RAN COVERAGE? — 750
N
Y

UE PERFORMS COMMUNICATION ACTION WITH NTN NODE ACCORDING TO INFORMATION IN EXPECTED COERAGE LEVEL REPORT — 755

END — 760

Figure 8:
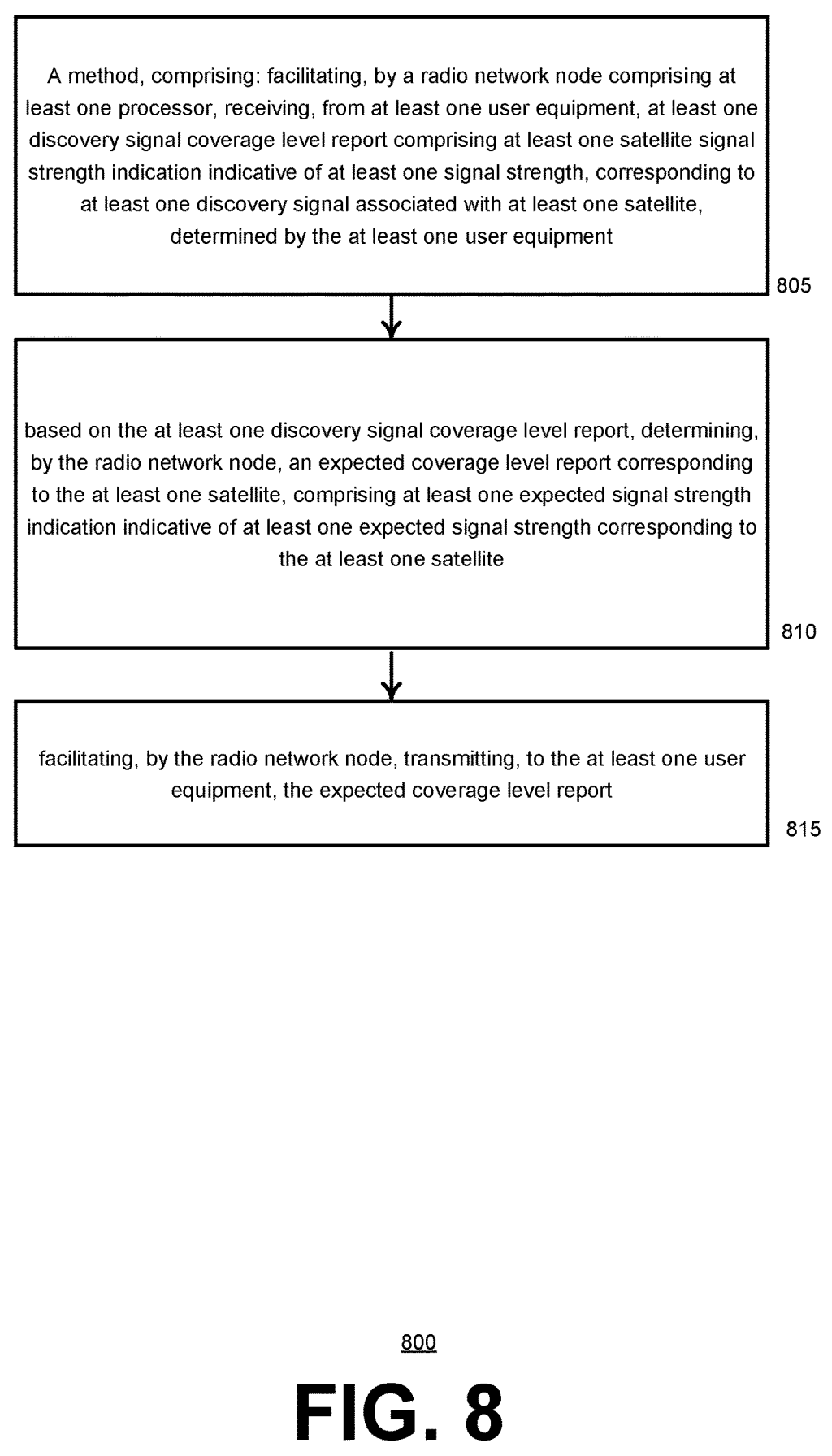

A method, comprising: facilitating, by a radio network node comprising at least one processor, receiving, from at least one user equipment, at least one discovery signal coverage level report comprising at least one satellite signal strength indication indicative of at least one signal strength, corresponding to at least one discovery signal associated with at least one satellite, determined by the at least one user equipment

805 based on the at least one discovery signal coverage level report, determining, by the radio network node, an expected coverage level report corresponding to the at least one satellite, comprising at least one expected signal strength indication indicative of at least one expected signal strength corresponding to the at least one satellite

810 facilitating, by the radio network node, transmitting, to the at least one user equipment, the expected coverage level report

Figure 9:
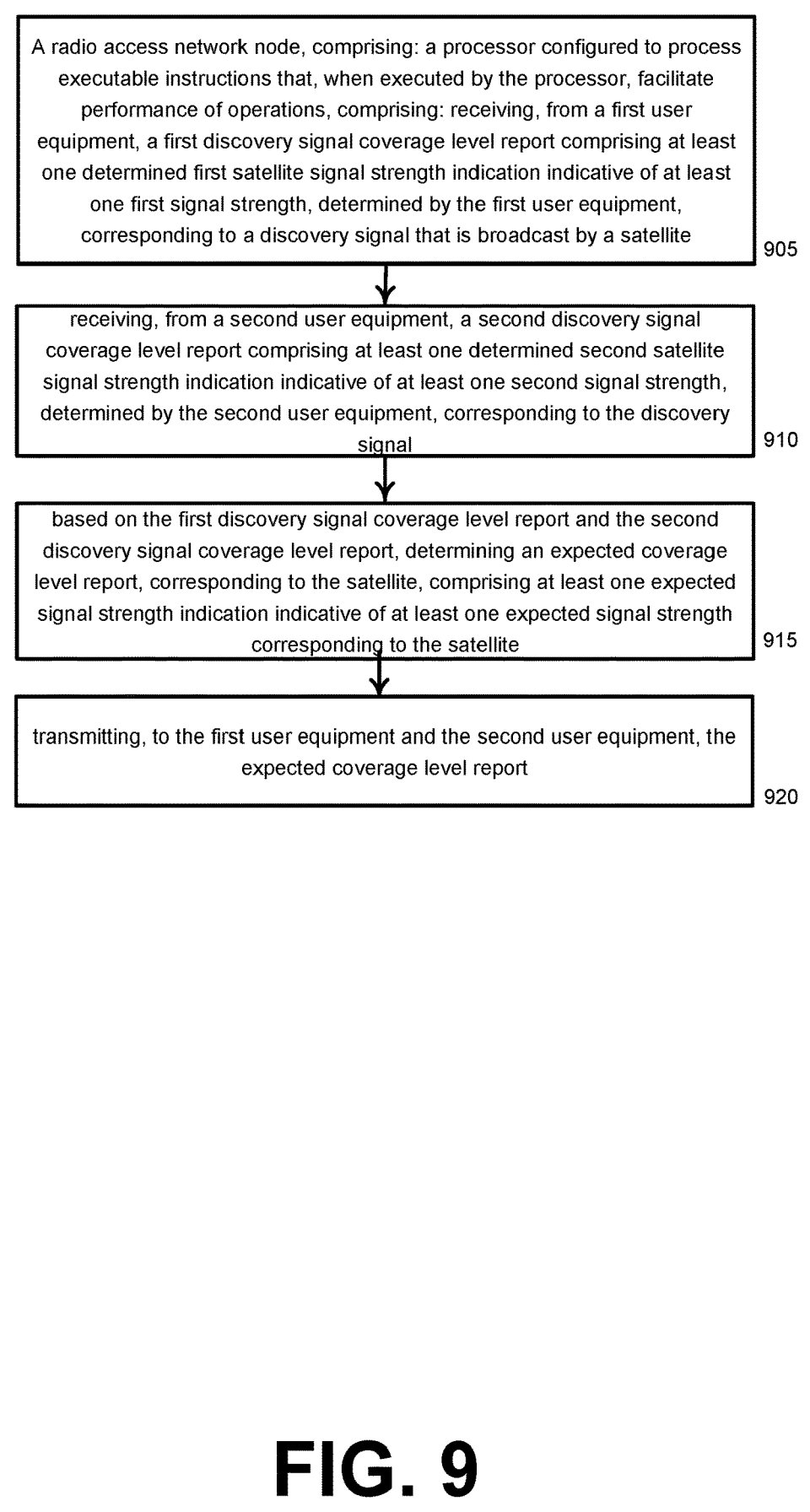

A radio access network node, comprising: a processor configured to process executable instructions that, when executed by the processor, facilitate performance of operations, comprising: receiving, from a first user equipment, a first discovery signal coverage level report comprising at least one determined first satellite signal strength indication indicative of at least one first signal strength, determined by the first user equipment, corresponding to a discovery signal that is broadcast by a satellite

905 receiving, from a second user equipment, a second discovery signal coverage level report comprising at least one determined second satellite signal strength indication indicative of at least one second signal strength, determined by the second user equipment, corresponding to the discovery signal

910 based on the first discovery signal coverage level report and the second discovery signal coverage level report, determining an expected coverage level report, corresponding to the satellite, comprising at least one expected signal strength indication indicative of at least one expected signal strength corresponding to the satellite

915 transmitting, to the first user equipment and the second user equipment, the expected coverage level report

Figure 10:
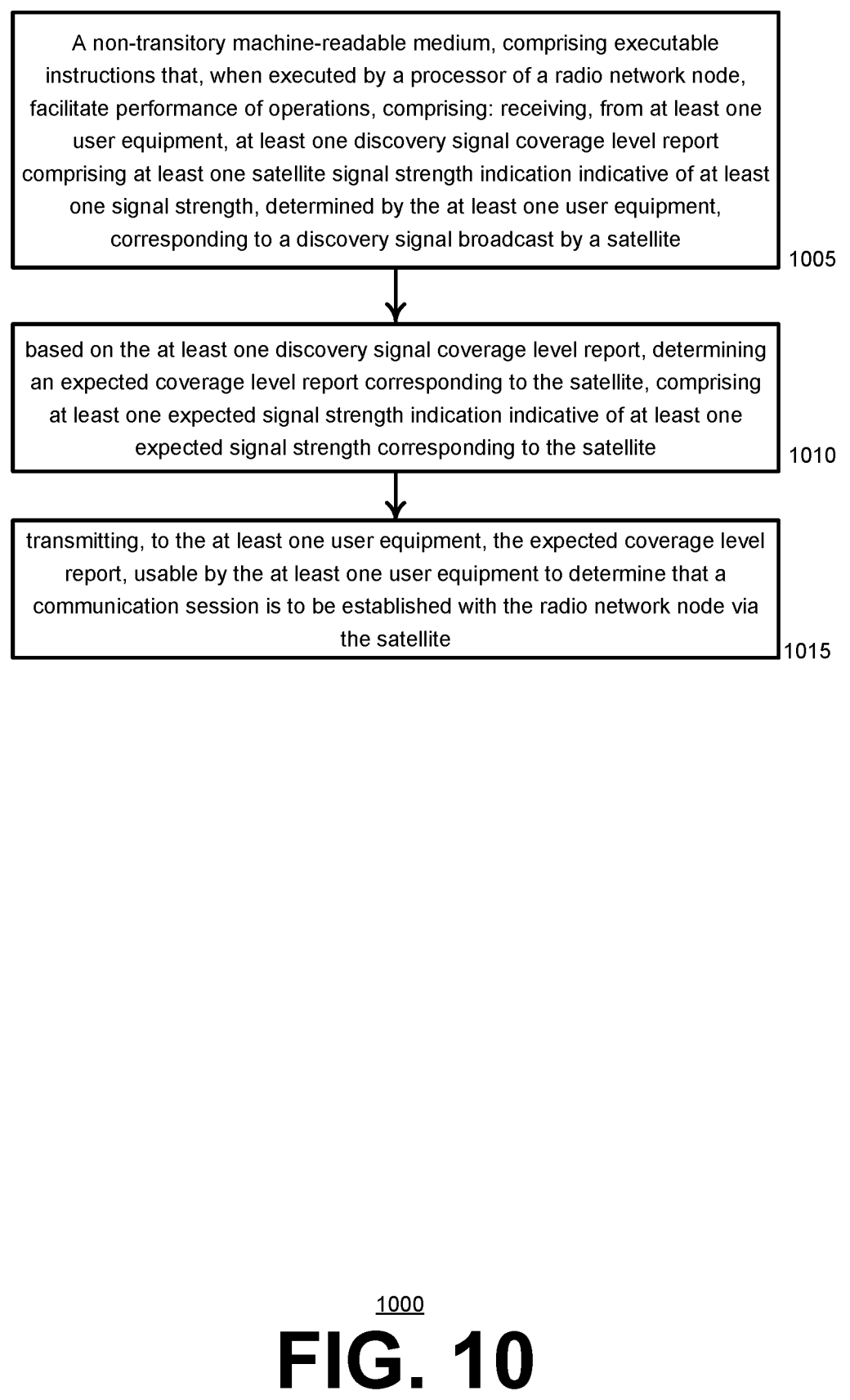

A non-transitory machine-readable medium, comprising executable instructions that, when executed by a processor of a radio network node, facilitate performance of operations, comprising: receiving, from at least one user equipment, at least one discovery signal coverage level report comprising at least one satellite signal strength indication indicative of at least one signal strength, determined by the at least one user equipment, corresponding to a discovery signal broadcast by a satellite

1005 based on the at least one discovery signal coverage level report, determining an expected coverage level report corresponding to the satellite, comprising at least one expected signal strength indication indicative of at least one expected signal strength corresponding to the satellite

1010 transmitting, to the at least one user equipment, the expected coverage level report, usable by the at least one user equipment to determine that a communication session is to be established with the radio network node via the satellite

SEMI-STATIC NON-TERRESTRIAL NETWORK DISCOVERY

BACKGROUND

The 'New Radio' (NR) terminology that is associated with fifth generation mobile wireless communication systems ("5G") refers to technical aspects used in wireless radio access networks ("RAN") that comprise several quality of service classes ("QoS"), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary. A RAN node may activate a network energy saving mode to reduce power consumption at the RAN node or at a non-terrestrial radio node.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a radio network node comprising at least one processor, receiving, from at least one user equipment, at least one discovery signal coverage level report comprising at least one satellite signal strength indication indicative of at least one signal strength, corresponding to at least one discovery signal associated with at least one satellite, determined by the at least one user equipment. The at least one user equipment may be configured to communicate with the non-terrestrial network node, which may comprise the at least one satellite. Based on the at least one discovery signal coverage level report, the method may further comprise determining, by the radio network node, an expected coverage level report corresponding to the at least one satellite. The expected coverage level report may comprise at least one expected signal strength indication indicative of at least one expected signal strength corresponding to the at least one satellite. The method may further comprise facilitating, by the radio network node, which may comprise a ground-based radio access network node, transmitting, to the at least one user equipment, the expected coverage level report.

The method may further comprise facilitating, by the radio network node, transmitting, to at least one of the at least one satellite, a discovery deactivation message comprising a discovery deactivation indication indicative to the at least one satellite to stop broadcasting the at least one discovery signal. The discovery deactivation message may further comprise a discovery deactivation period indication indicative of a discovery deactivation period during which the at least one satellite is to halt broadcasting the at least one discovery signal. The at least one discovery signal may comprise synchronization signal block information. The expected coverage level report may comprise access information usable by the at least one user equipment to establish a connection with the at least one satellite during the discovery deactivation period. The expected coverage level report may comprise default transmission configuration information usable by the at least one user equipment to: avoid establishing a communication session with the at least one satellite and transmit, to the at least one satellite, a data transmission. The data transmission may comprise at least one of: at least one traffic protocol data unit corresponding to a latency-stringent traffic flow, or at least one emergency protocol data unit corresponding to an emergency message.

In an embodiment, a first discovery signal coverage level report of the at least one discovery signal coverage level report may be received from a first user equipment of the at least one user equipment. A second discovery signal coverage level report of the at least one discovery signal coverage level report may be received from a second user equipment of the at least one user equipment. The first discovery signal coverage level report may comprise a first satellite signal strength indication, of the at least one satellite signal strength indication, indicative of a first signal strength of the at least one signal strength, corresponding to a first discovery signal of the at least one discovery signal associated with a first satellite of the at least one satellite. The second discovery signal coverage level report may comprise a second satellite signal strength indication of the at least one satellite signal strength indication, indicative of a second signal strength of the at least one signal strength, corresponding to a second discovery signal of the at least one discovery signal associated with a second satellite of the at least one satellite. The expected coverage level report may further comprise a first expected signal strength indication of the at least one expected signal strength indication indicative of a first expected signal strength of the at least one expected signal strength corresponding to the first satellite. The expected coverage level report may comprise a second expected signal strength indication of the at least one expected signal strength indication indicative of a second expected signal strength of the at least one expected signal strength corresponding to the second satellite.

In an embodiment, a first discovery signal coverage level report of the at least one discovery signal coverage level report may be received from a first user equipment of the at least one user equipment. A second discovery signal coverage level report of the at least one discovery signal coverage level report may be received from a second user equipment of the at least one user equipment. The first discovery signal coverage level report may comprise a first satellite signal strength indication of the at least one satellite signal strength indication, indicative of a first signal strength of the at least one signal strength, corresponding to a first discovery signal of the at least one discovery signal associated with a first satellite of the at least one satellite. The second discovery signal coverage level report may comprise a second satellite signal strength indication of the at least one satellite signal strength indication, indicative of a second signal strength of the at least one signal strength, corresponding to a second discovery signal of the at least one discovery signal associated with the first satellite. The at least one expected signal strength indication may be determined based on the first signal strength and the second signal strength.

In an embodiment, the radio network node may be a first radio network node. The expected coverage level report may be a first expected coverage level report. The at least one expected signal strength indication may be a first expected signal strength indication indicative of a first expected signal strength of the at least one expected signal strength. The method may further comprise facilitating, by the first radio network node, receiving, from a second radio network node, a second expected coverage level report corresponding to the at least one satellite, comprising a second expected signal strength indication of the at least one expected signal strength indication, indicative of a second expected signal strength of the at least one expected signal strength corresponding to the at least one satellite. The first expected coverage level report may be further determined based on the second expected coverage level report.

In an embodiment, the radio network node may be a first radio network node. The expected coverage level report may be a first expected coverage level report. The at least one expected signal strength indication may be a first expected signal strength indication indicative of a first expected signal strength of the at least one expected signal strength. The method may further comprise facilitating, by the first radio network node, transmitting, to a second radio network node, the first expected coverage level report to be usable by the second radio network node to determine a second expected coverage level report corresponding to the at least one satellite, based on a second expected signal strength indication of the at least one expected signal strength indication indicative of a second expected signal strength of the at least one expected signal strength corresponding to the at least one satellite. The first expected coverage level report may be further determined based on the second expected signal strength indication.

In an embodiment, the at least one expected signal strength indication may comprise a minimum expected signal strength corresponding to the at least one satellite or a maximum expected signal strength corresponding to the at least one satellite.

In an embodiment, the radio network node may be a ground-based radio access network node and the at least one satellite may be part of at least one non-terrestrial network node.

In another example embodiment, a radio access network node may comprise a processor configured to process executable instructions that, when executed by the processor, facilitate performance of operations, comprising receiving, from a first user equipment, a first discovery signal coverage level report comprising at least one determined first satellite signal strength indication indicative of at least one first signal strength, determined by the first user equipment, corresponding to a discovery signal that is broadcast by a satellite. The operations may further comprise receiving, from a second user equipment, a second discovery signal coverage level report comprising at least one determined second satellite signal strength indication indicative of at least one second signal strength, determined by the second user equipment, corresponding to the discovery signal. Based on the first discovery signal coverage level report and the second discovery signal coverage level report, the operations may further comprise determining an expected coverage level report, corresponding to the satellite, comprising at least one expected signal strength indication indicative of at least one expected signal strength corresponding to the satellite. The operations may further comprise transmitting, to the first user equipment and the second user equipment, the expected coverage level report.

In an embodiment, the operations may further comprise transmitting, to the satellite, a discovery deactivation message comprising a discovery deactivation indication indicative to the satellite to halt broadcasting of the discovery signal during a discovery deactivation period. The at least one expected signal strength indication may be usable by the first user equipment or the second user equipment to communicate with, or establish communication with, the satellite during the discovery deactivation period.

In an embodiment, the radio access network node may be a first radio access network node. The expected coverage level report may be a first expected coverage level report. The at least one expected signal strength indication may be a first expected signal strength indication indicative of a first expected signal strength of the at least one expected signal strength. The operations may further comprise receiving, from a second radio access network node, a second expected coverage level report corresponding to the satellite, comprising a second expected signal strength indication of the at least one expected signal strength indication indicative of a second expected signal strength of the at least one expected signal strength corresponding to the satellite, wherein the first expected coverage level report is further determined based on the second expected coverage level report.

In yet another example embodiment, a non-transitory machine-readable medium may comprise executable instructions that, when executed by a processor of a radio network node, facilitate performance of operations comprising receiving, from at least one user equipment, at least one discovery signal coverage level report comprising at least one satellite signal strength indication indicative of at least one signal strength, determined by the at least one user equipment, corresponding to a discovery signal broadcast by a satellite. Based on the at least one discovery signal coverage level report, the operations may further comprise determining an expected coverage level report corresponding to the satellite, comprising at least one expected signal strength indication indicative of at least one expected signal strength corresponding to the satellite. The operations may further comprise transmitting, to the at least one user equipment, the expected coverage level report, usable by the at least one user equipment to determine that a communication session is to be established with the radio network node via the satellite.

In an embodiment, the operations may further comprise transmitting to the satellite a discovery deactivation indication indicative to the at least one satellite to stop broadcasting of the discovery signal during a discovery deactivation period. The discovery signal may comprise synchronization signal block information. The expected coverage level report may be usable by the at least one user equipment to determine to establish a communication session with the radio network node via the satellite during the discovery deactivation period.

BRIEF DESCRIPTION OF THE DRAWINGS

FIG. 6 illustrates a timing diagram of an example embodiment.

FIG. 7 illustrates a flow diagram of an example embodiment method.

FIG. 8 illustrates a block diagram of an example method embodiment.

FIG. 9 illustrates a block diagram of an example radio access network node.

FIG. 10 illustrates a block diagram of an example non-transitory machine-readable medium embodiment.

DETAILED DESCRIPTION OF THE DRAWINGS

Figure 1:
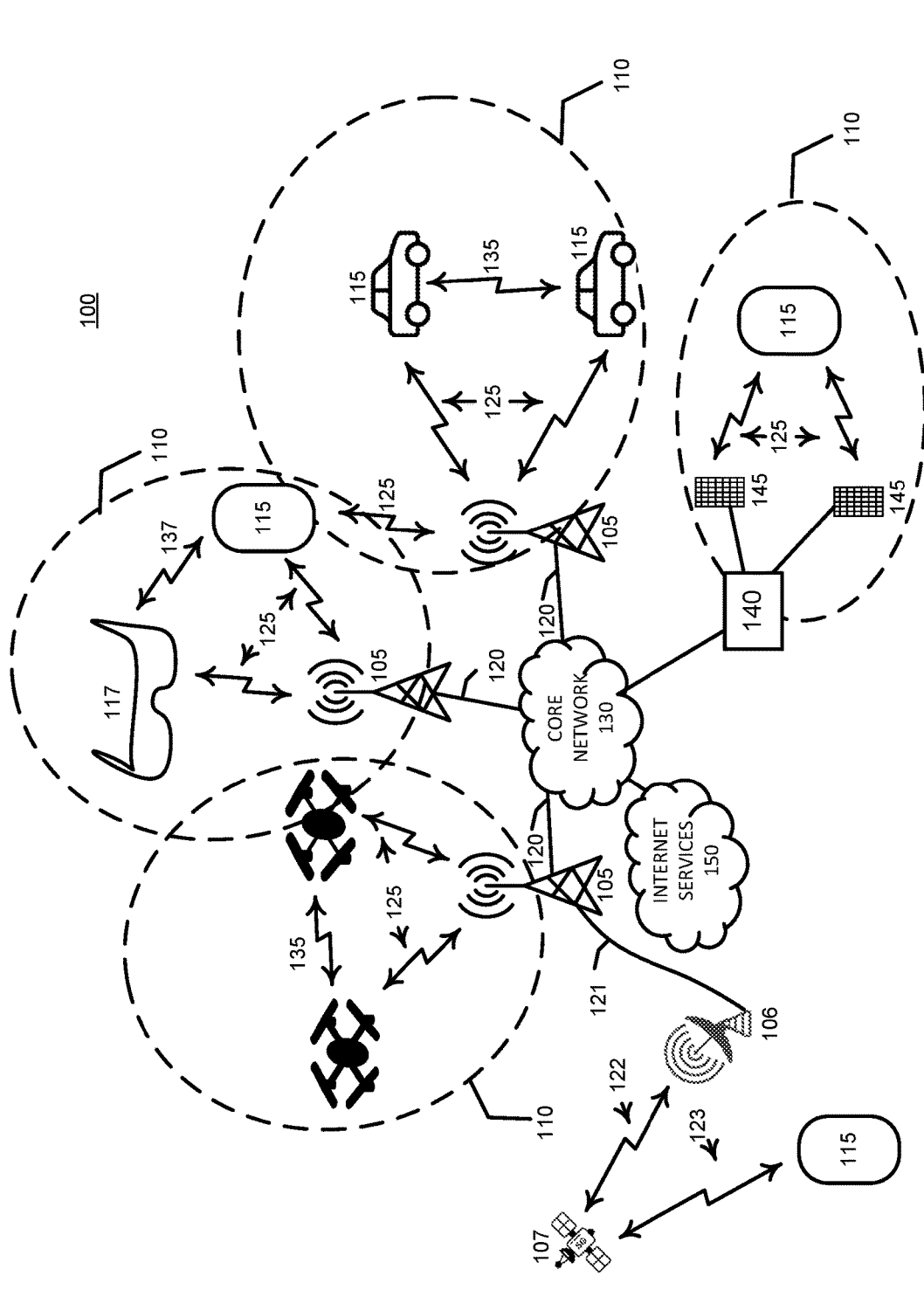
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 11.

Continuing with discussion of FIG. 1, base stations 105 may be dispersed throughout a geographic area to form the wireless communication system 100 and may be devices in different forms or having different capabilities. Base stations 105 and UEs 115 may wirelessly communicate via one or more communication links 125. A base station 105 may be referred to as a RAN node. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, a wireless transmit receive unit ("WTRU"), or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, an end extended reality appliance, an extended reality processing unit, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHZ)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office).

A base station 105 may support one or multiple cells and may also support communications over the one or more cells using one or more component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The evolution of communication networks has witnessed remarkable advancements over the past decades. A significant extension of 5G's potential may lie beyond the conventional terrestrial infrastructure, giving rise to what are known as 5G Non-Terrestrial Networks ("NTN").

Non-Terrestrial Networks may encompass a diverse range of technologies and architectures that may comprise space-based, airborne, and maritime platforms to enhance global communication capabilities. Integration of 5G and non-terrestrial environments may facilitate connectivity being established, maintained, and optimized to remote and under-served regions.

Satellites equipped with 5G capabilities constitute an aspect of 5G NTN. Satellites, positioned in low Earth orbit ("LEO"), medium Earth orbit ("MEO"), or geostationary orbit ("GEO"), may form an intricate web of interconnected nodes. The satellites can provide widespread coverage, offering high-speed data connections, low latency communication, and global mobility. Satellites may facilitate broadband access in rural and remote areas, disaster-stricken regions, and on moving vehicles, ships, and aircraft, thus bridging the digital divide.

Satellite-based NTN can bridge connectivity gaps in remote and rural areas, provide disaster recovery communication, and offer enhanced coverage for maritime and aeronautical services. High-altitude platforms and drones equipped with cellular capabilities can serve as temporary network relays for events, emergencies, or areas with signal-strength coverage deficiencies. such applications may benefit not only traditional voice and data services but also for technologies, such as, for example, Internet of Things ("IT"), wherein connectivity is typically a desirable, or a fundamental requirement.

A non-terrestrial base station 106, which may comprise a satellite antenna, may be coupled to core network 130. Non-terrestrial base station 106 may communicate with satellite 107, which may communicate with a user equipment 115. Non-terrestrial base station 106, which may be referred to as a non-terrestrial network ("NTN") gateway, and satellite 107 may facilitate delivering traffic corresponding to a radio access network, which may comprise RAN nodes 105, core network 130, backhaul links 120, and long-range wireless links 125, to user equipment that may be located beyond coverage or a RAN node 105. Links 121 between RAN nodes 105 and satellite base station/gateway 106 may comprise coaxial, fiber, or wireless links that may be similar to links 120. Links 122 to satellite node 107 and links 123 from satellite/node 107 to UE 115 may comprise line-of-sight microwave signal transmission. A UE 115 may be configured with at least one antenna, or at least one processor, to facilitate transmitting or receiving microwave signals to/from satellite node 107. Description herein of a radio node or a radio network node may be a reference to either a RAN node 105 or a satellite node 107. Reference to a satellite node, or a non-terrestrial network node, may comprise a reference to satellite 107, base station gateway 106, or a combination of satellite 107 and base station/gateway 106.

It will be appreciated that although an NTN node may benefit the most from embodiments disclosed herein, techniques disclosed herein may be of benefit to a ground-based RAN node. Thus, use of "radio network node" may be interpreted as referring to a ground-based RAN node, or to a satellite node, which may comprise a gateway 106 or a satellite 107.

Although use of NTNs can result in greatly expanding coverage that may be available with ground-based RANs, or complementing coverage corresponding to a ground-based RAN by overlapping terrestrial ("TN") and non-terrestrial ("NTN") coverages, thus making NTNs potentially cost efficient in remote rural areas, mountainous areas, and in general where ground cellular deployments are either not possible or not cost efficient. However, performance problems, which may not be problems with respect to a ground-based TN implementation, may result from integration of NTNs with ground cellular networks. For example, due to operation being facilitated by batteries or solar cells, for example, an energy consumption specification for an NTN node is more stringent than for a TN node. Relative to existing voice-dominated NTN deployments that do not facilitate cellular communication (e.g., satellite phone systems that so not implement 5G cellular technology), cellular NTNs/satellites that facilitate functionality of a 5G ground-based RAN node exhibit a significant increase in power/energy consumption.

Energy efficiency of integrated cellular-NTN/satellite deployments is a challenge due to cellular operations that an NTN node must support according to conventional techniques. For example, according to conventional techniques, an NTN/satellite, partially or fully offering cellular connectivity, must always transmit NTN discovery information. With respect to a TN RAN node deployment, discovery information may be considered as always-on signalling or message that may comprise energy-heavy synchronization signal block information ("SSB"). SSB signals may be used by NTN-capable user equipment devices to be able to determine the presence of active NTNs/satellites and respective perceived coverage levels. Such always-on signalling places a large energy usage on cellular NTNs/satellites, which typically cannot be efficiently upgraded due to unique aspects of NTN/satellite nodes, (e.g., being battery powered instead of receiving power from a commercial power grid, high-speed orbiting, need for light weight and minimizing of hardware, etc.). Embodiments disclosed herein minimize NTN energy inefficiency caused by frequent transmission of the energy-heavy NTN discovery signalling, which according to current techniques may be relaxed by increasing transmission periodicity of the NTN discovery information. However, increasing transmission periodicity of discovery signals (e.g., increasing time between transmission repetitions) comes at the expense of degrading NTN access performance since, according to conventional techniques, idle mode user equipment devices are not able to access and camp on an active NTN when the NTN is not transmitting discovery information signals/messages/objects. Embodiments disclosed herein minimize, or eliminate, such degraded NTN access performance.

Satellites, and associated power supplies, are not designed with capability to facilitate current cellular procedures without regard to energy consumption. For example, cellular NTNs/satellites, when fully or partially executing and processing a 5G (and future generation technology) radio protocol stack, must comply with existing idle mode procedures and operations, such as always transmitting downlink signaling and energy-heavy synchronization blocks to facilitate discovery by NTN-capable user equipment of the presence of the NTN connectivity as well as to determine respective coverage levels corresponding to the NTN satellite/node, leading to a significant energy consumption at the NTNs/satellite node.

However, 'perceived' NTN coverage (e.g., perceived, or determined, by NTN-capable user equipment devices) varies much less from location to location than perceived coverage corresponding to a ground-based RAN node. GEO NTNs typically maintain an almost fixed speed relative to the Earth and orbit the Earth at significantly higher vertical altitudes (e.g., much higher, or farther from Earth, than LEO NTNs). This leads to facilitating an almost semi-static, low-variance coverage level and performance level for a geographic area with signal coverage from an NTN satellite.

Embodiments disclosed herein may make use of the low-variability signal coverage corresponding to NTN's relative to ground-based RAN nodes to minimize energy loading on an NTN node that may result from facilitating discovery of NTN nodes without impacting idle-mode performance and operation of NTN-capable user equipment (e.g., impact on performance at a user equipment with respect to discovery and coverage determination of an NTN node is minimized). Using embodiments disclosed herein, cellular NTNs/satellites may avoid frequent transmission of signaling and energy inefficient discovery information (e.g., downlink synchronization signals). Instead, a ground/TN RAN node, which may have overlapping coverage with an NTN of interest, may determine, filter, and broadcast semi-static NTN coverage and access information on behalf of the NTN. Thus, an idle mode user equipment device may be made aware of an active NTN and expected coverage levels corresponding to the NTN that tend to be substantially invariable. By using an expected coverage level corresponding to an NTN satellite node, the NTN node may avoid transmitting NTN discovery information for a configured period.

For example, within a TN-NTN overlapping coverage area (e.g., a geographic coverage area corresponding to a TN node being within, or at least overlapping, a geographic coverage are corresponding to an NTN node), one or more TN nodes may collect and exchange real-time NTN coverage information, which may be compiled based on NTN coverage measurement reports received from one or more NTN-capable user equipment devices that are present within the coverage area(s) of the TN RAN node(s). Coverage measurement reports may be exchanged between the one or more TN nodes via backhaul communication links. Such backhaul exchange may facilitate coordinating TN RAN nodes in creating a coverage map corresponding to active NTNs/satellites that are 'seen' by user equipment devices within a coverage of one of the TN RAN nodes and adjacent TN RAN nodes. The exchanged inter-TN RAN node NTN coverage information may comprise determined, cell-specific, minimum and maximum NTN coverage levels (e.g., minimum or maximum measured signal strength values), that may be reported by NTN-capable user equipment that are within a coverage of one or more of the TN RAN nodes. Accordingly, due to low NTN signal coverage variance, a TN RAN node may compile and transmit (e.g., broadcasts or multicasts) an NTN coverage information update, via a downlink radio interface (e.g., a link 125 shown in FIG. 1), that may be indicative to user equipment devices of active NTN/satellite identifiers, expected signal strength/coverage levels, for example an average coverage level, a minimum coverage level, a maximum coverage level, or prefiltered coverage levels, that may be associated with additional NTN access information. Thus, despite NTNs/satellites avoiding broadcasting NTN discovery information, NTN-capable user equipment devices can still determine active NTN nodes, coverage levels corresponding to the active NTN nodes, or basic access information, to facilitate NTN node cell camping, which may be beneficial when a user equipment cannot detect a strong signal from a ground-based TN node.

Semi-Static Non-Terrestrial Network Discovery.

Accordingly, unlike with conventional techniques, wherein a RAN node transmits its own coverage and access information, according to embodiments disclosed herein a TN RAN node may exchange, determine, or transmit expected coverage and access information corresponding to another node. Moreover, a ground-based TN RAN node may determine and broadcast information corresponding to an expected coverage information, which may not be a measured signal strength value. According to conventional techniques, a RAN node determines and reports a measured value, or values, or an indication corresponding to measured values if quantization is used, that correspond to a reference signal. (This applies generally to coverage measurement procedures, even procedures that are performed by user equipment.) However, according to embodiments disclosed herein, a ground-based TN RAN node may determine and broadcast an expected coverage level, or range, corresponding to one or more active NTN(s)/satellite(s) that are not actual measured values made by a TN RAN node, but instead are determined based on values previously determined by NTN-capable user equipment devices, or based on additional filtering and/or processing. Furthermore, according to embodiments disclosed herein, an NTN-capable user equipment device may make NTN selection and/or camping and/or handover determinations based on an expected received coverage, without actually performing NTN reference signal measurements, when NTNs are not transmitting downlink discovery signals or reference signal discovery information.

Figure 2:
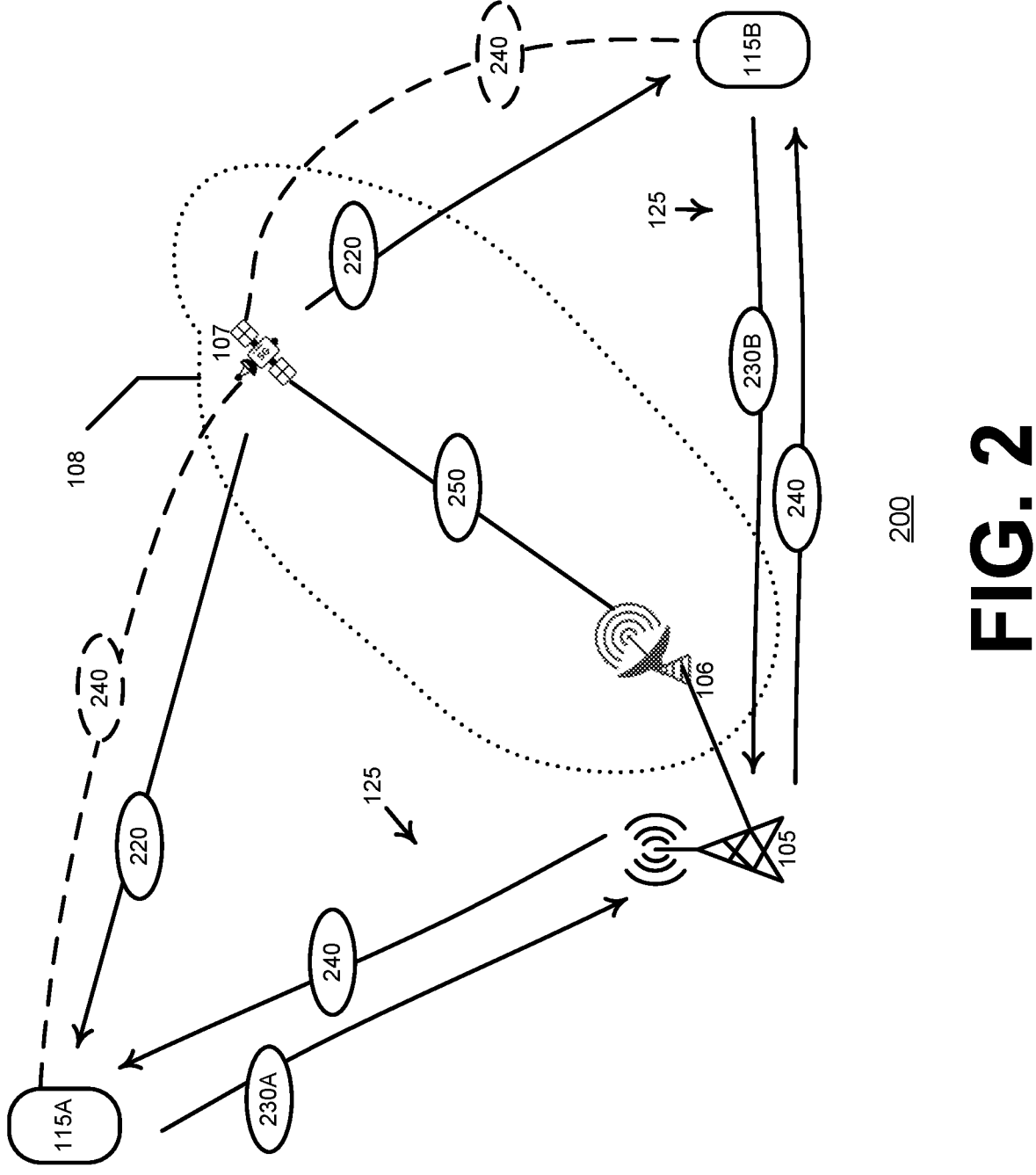
FIG. 2 illustrates an environment with a terrestrial radio network node in communication with multiple user equipment and a satellite node.

Turning now to FIG. 2, the figure illustrates ground-based RAN node 105, base station 106, and NTN node 107, any one or more of which may be referred to as a radio network node. For purposes of description, radio network node 108 may comprise one or more of RAN node 105, gateway 106, or satellite 107. Cellular-integrated NTNs/satellite 107 may transmit NTN discovery information 220 to NTN-capable user equipment 115A and 115B, including NTN downlink reference signals for NTN coverage estimation by the NTN-capable devices. NTN-capable user equipment devices 115A and 115B may detect and decode downlink NTN discovery reference signal(s) 220 transmitted by NTN satellite/node 107, and the user equipment may determine signal strength (s)/coverage level(s) corresponding to the NTN satellite node. NTN-capable user equipment 115A or 115B may transmit discovery signal coverage level report(s) 230A and 23B, respectively, corresponding to NTN node 107, towards currently serving, or currently selected, ground/TN RAN node 105. Discovery signal coverage level report(s) 230 may comprise information indicative of active NTN satellite node 107, including an identifier corresponding to the NTN satellite node. Discovery signal coverage level report(s) 230 may comprise NTN coverage levels, associated with the NTN's identifier, determined by user equipment 115A or 115B. Ground/TN RAN node 105 may receive and analyze discovery signal coverage level report(s) 230A or 230B received from NTN-capable user equipment devices 115A or 115B. Using information contained in the one or more discovery signal coverage level report(s) 230A or 230B, ground TN RAN node 105 may determine minimum or maximum coverage levels associated with NTN 107. A minimum or maximum coverage level may be a minimum or a maximum coverage level/signal strength reported by NTN-capable user equipment device(s) 115A or 115B.

Figure 3:
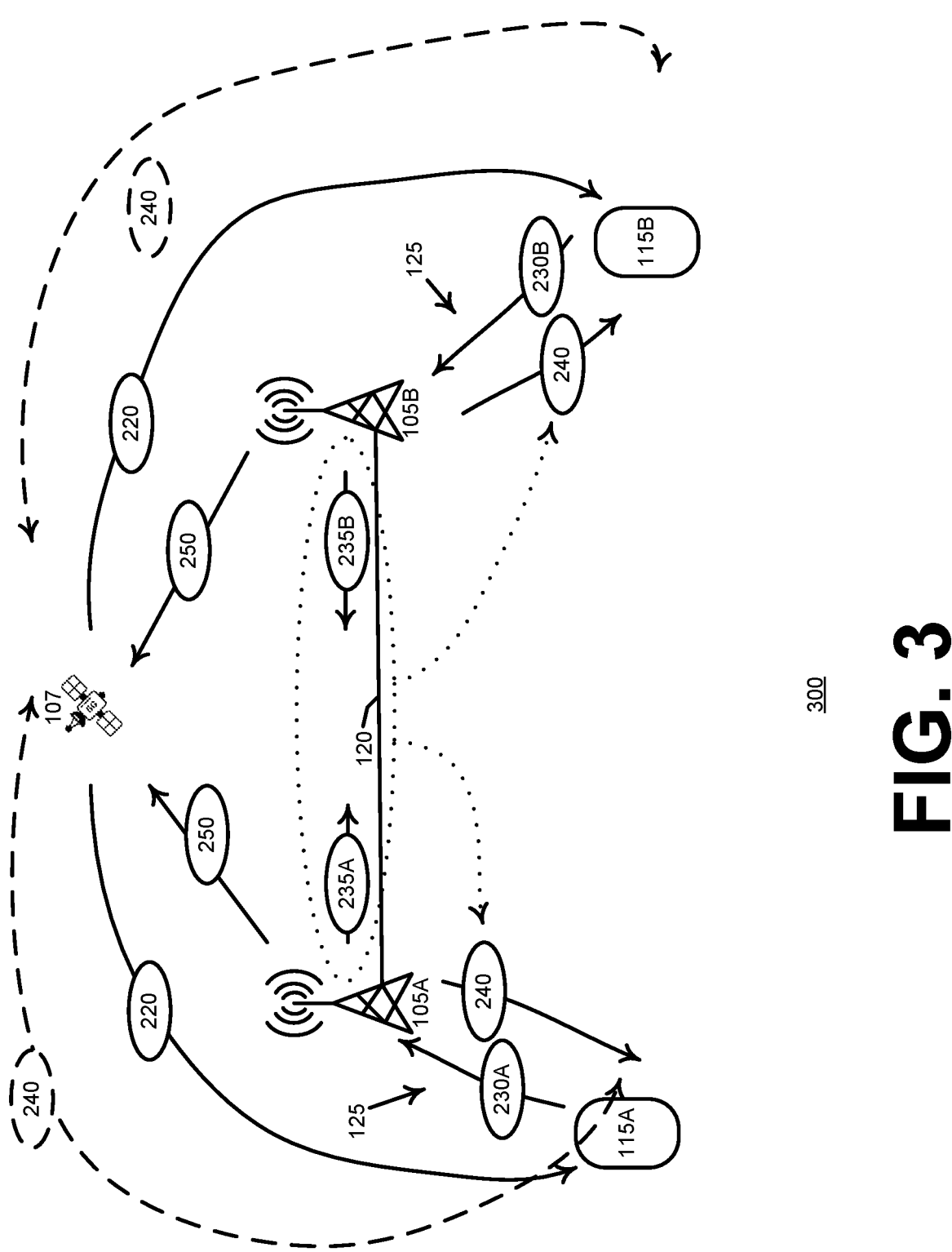
FIG. 3 illustrates an environment with two terrestrial radio nodes in communication with a satellite node and multiple user equipment.

In an embodiment, as shown in FIG. 3, one or more ground-based TN RAN nodes 105A or 105B may exchange NTN coverage information 235A or 235B, that may have been received in, or derived from, discovery signal coverage level report(s) 230A or 230B. TN RAN nodes 105A and 105B may exchange, share, or coordinate NTN coverage information via backhaul links 120 (e.g., X2/Xn interfaces). The exchanged, shared, or coordinated information 235 may comprise determined minimum and maximum coverage levels corresponding to each of one or more identifiers associated with one or more active NTN nodes. Upon receiving NTN coverage information 235 from an adjacent TN RAN nodes, a TN RAN node may combine information received in one or more discovery signal coverage level report(s) 230 and compile/generate therefrom an aggregate NTN coverage information block, which may be referred to as an expected coverage level report 240, and which may comprise information corresponding to at least one satellite identified in a discovery signal coverage level report 230.

Expected coverage level report 240 may comprise at least one expected signal strength indication indicative of at least one expected signal strength corresponding to satellite node 107. Expected coverage level report 240 may comprise one or more identifiers corresponding to one or more active NTN satellite nodes 107. Expected coverage level report 240 may comprise an expected coverage level, or expected coverage levels, corresponding to NTN satellite 107, which may be identified in the expected coverage level report. Expected coverage level report 240 may comprise other access information, such as, for example, uplink random access occasions, or resources, associated with NTN node 107 as identified in the expected coverage level report. Expected coverage level report 240 may comprise default uplink transmission configuration information (e.g., uplink modulation and coding information) corresponding to NTN node 107 identified in the expected coverage level report. An NTN coverage level may be determined as an absolute minimum or maximum, an average, or a specially-filtered coverage level associated with each active NTN ID (e.g., a coverage level may be determined, based on signal strength measured by a user equipment, to result in the user equipment selecting an NTN even if a ground-based RAN could provide coverage to the user equipment). A ground-based RAN node may combine information generated by multiple NTN-capable user equipment devices into a single coverage level value to share with adjacent ground-based RAN nodes. In an example, a ground-based RAN node may use a minimum coverage level value of values determined by multiple NTN-capable user equipment as an expected signal strength/coverage level value, or a ground-based RAN node may use a maximum coverage level value of multiple values determined by multiple NTN-capable user equipment as an expected signal strength value. In another example, a ground-based RAN may apply a filter or function to multiple coverage level values determined by multiple user equipment. In an example, a core network component may configure a ground-based RAN node to use an average of all NTN coverage level values determined by user equipment during a measurement period as an expected coverage level value. In another example, a ground-based RAN node may apply a weighted average filter or function to NTN coverage level values determined by multiple user equipment such that samples may not have equal influence on a determination of an expected NTN coverage level value that may be shared towards adjacent RAN nodes.

A TN RAN node 105 may transmit (e.g., via single-casting, multicasting, or broadcasting) expected coverage level report 240, that may comprise compiled, aggregate NTN coverage information block information or configuration information, towards NTN-capable user equipment devices 115A or 115B via links 125.

One or more TN RAN node(s) may transmit, via an NTN gateway interface (e.g., a microwave communication link) towards at least one NTN satellite, a temporary NTN discovery information transmission deactivation indication 250, which may be referred to as a discovery deactivation message. Discovery deactivation message 250 may comprise a discovery deactivation indication indicative to satellite 107 to stop broadcasting the at least one discovery signal. Discovery deactivation message 250 may comprise a discovery deactivation period indication indicative of a discovery deactivation period during which satellite 107 is to halt broadcasting at least one discovery signal 220. Instead of NTN satellite node 107 continuing to broadcast discovery information via discovery signal 220, the satellite node can deactivate broadcasting discovery information during the discovery deactivation period. User equipment 115A or 115B may use semi-static NTN expected coverage information contained in expected coverage level report 240 that a ground-based TN RAN 105 node may broadcast on behalf of the NTNs/satellite 107. Thus, energy consumption at the NTN node that has halted broadcasting of the discovery information is reduced without impacting NTN access performance experienced by an NTN-capable user equipment devices 115A or 115B.

Figure 4:
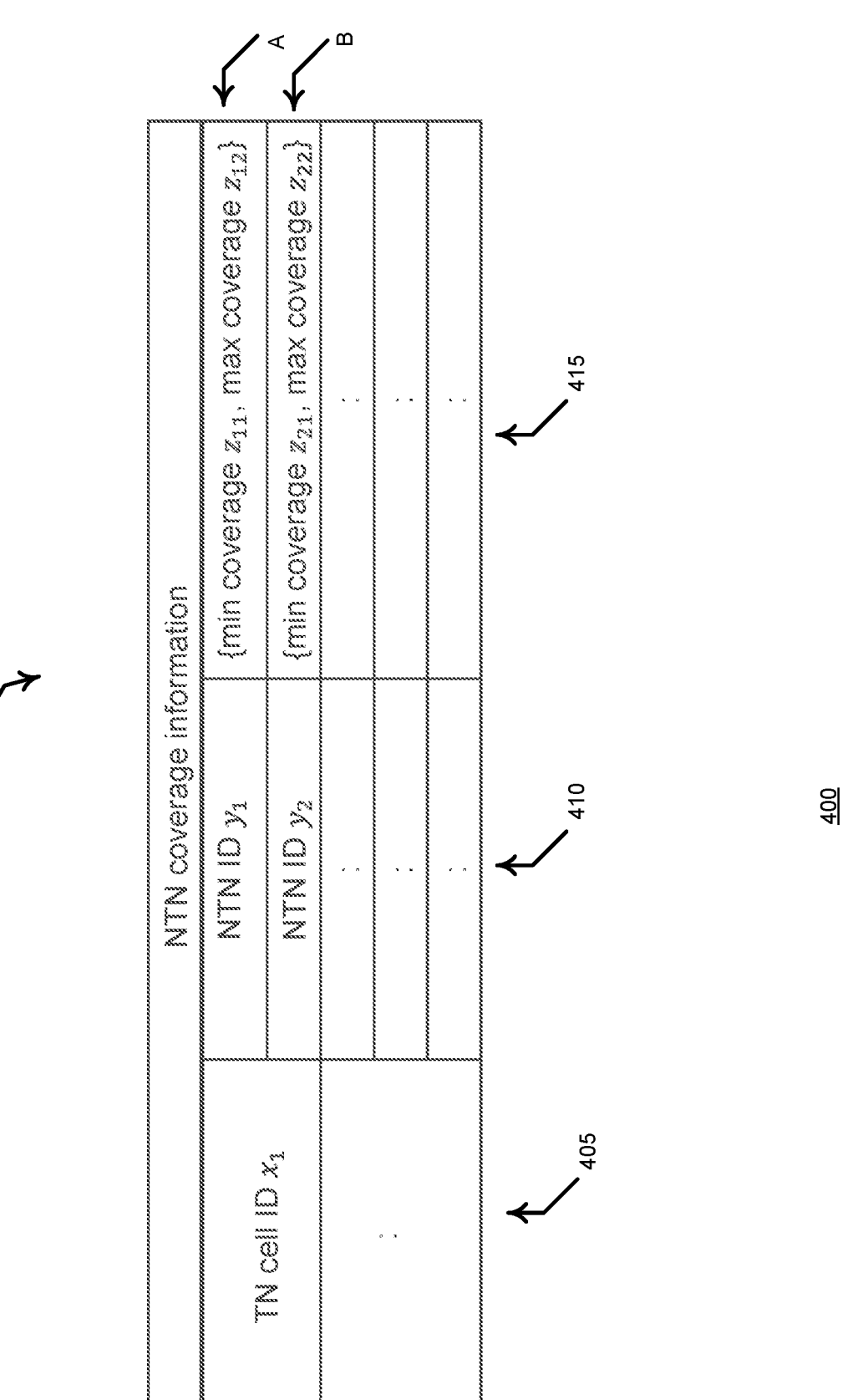
FIG. 4 illustrates example coverage level information shared between terrestrial nodes.

Turning now to FIG. 4, contents of an example NTN coverage information 235 are shown. Source TN RAN node identifier field 405 may comprise an identifier corresponding to a ground-based RAN node that is transmitting the current NTN coverage information report/message 235 via backhaul links towards another adjacent TN RAN node. NTN node field 410 may comprise one or more NTN/satellite identifiers respectively corresponding to one or more NTN nodes that have been determined, based on device NTN measurement reports (e.g., reports 230 described in reference to FIG. 2 or 3) within a geographic coverage area of the transmitting TN RAN node indicated in field 405. For each NTN identifier indicated in field(s) 410, determined minimum or maximum NTN coverage values may be included in signal strength field(s) 415. Signal strength field 415 may comprise measured values, or samples, received from NTN-capable user equipment devices, via a message 230, that are within signal coverage of the source TN RAN node indicated in field 405. Information contained in signal strength field(s) 415 may comprise information corresponding to NTN nodes that that may be transmitting, or that may have transmitted, NTN coverage information signaling (e.g., a discovery signal 220).

Figure 5:
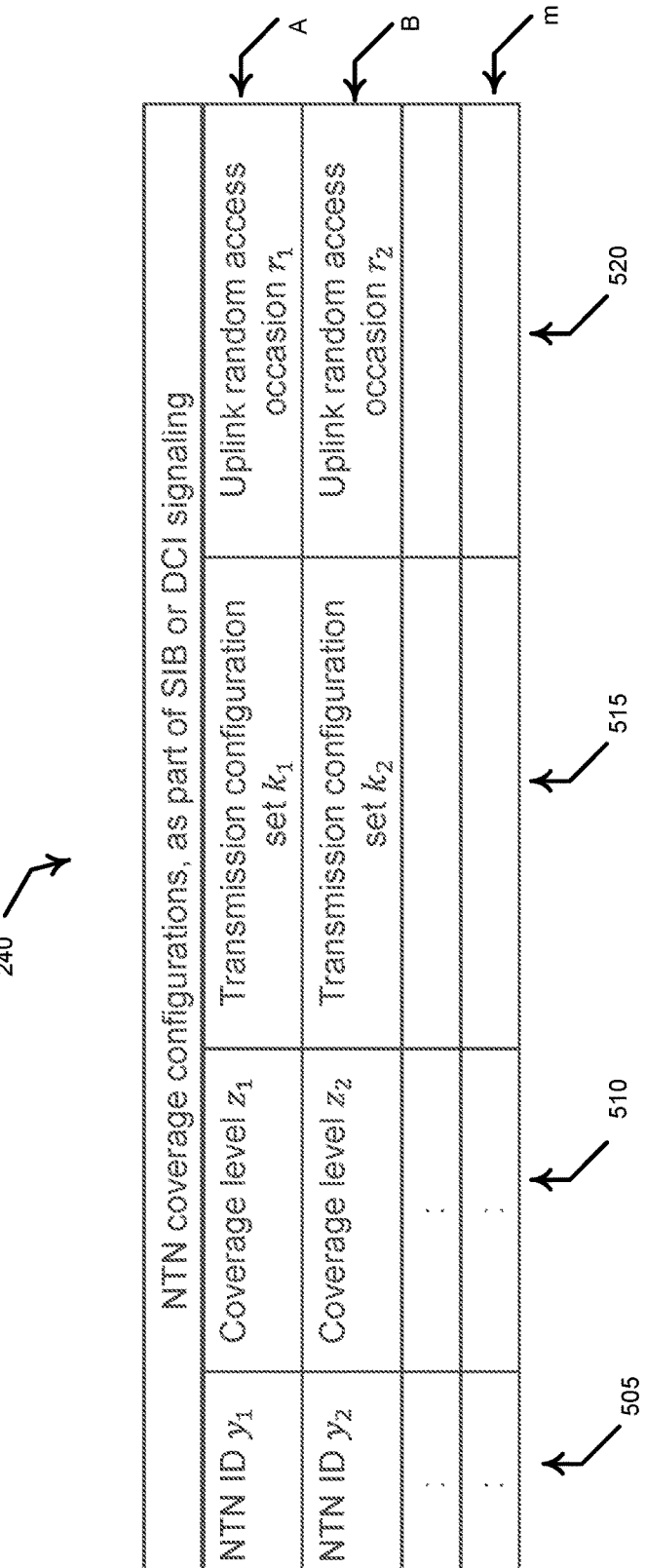
FIG. 5 illustrates an example expected coverage level report.

Turning now to FIG. 5, expected coverage level report 240 may comprise identifier information in NTN identification field 505. An identifier in NTN identification field 505 may correspond to an NTN node that transmitted a discovery signal 220 that may be a basis for a user equipment determining information contained in one or more discovery signal coverage level report(s) 230. Coverage level field 510 may comprise an expected signal strength, or expected signal strengths, corresponding to an NTN node identified in respective field 505. A user equipment that receives expected coverage level report 240 may use a signal strength indicated in field 510A, for example, to determine to establish a communication session, for example via radio resource control signaling, with an NTN node indicated in respective field 505A. An expected coverage level value in a field 510A may be determined by a TN RAN node to be an absolute minimum received coverage value with respect to all adjacent TN RAN nodes that may have transmitted NTN coverage information 235 related to an NTN node identified in field 505A. A core network component may configure a TN RAN such that a value in field 510A may be determined by a TN RAN node to be a specially-filtered coverage level, where the TN RAN node applies a special filter on all NTN coverage samples corresponding to an NTN node identified in field 505A, received from all adjacent TN RAN nodes.

Expected coverage level report 240 may comprise default NTN transmission configuration field(s) 515. Information contained in filed(s) 515 may comprise one or more indications indicative of a default NTN modulation and coding scheme. Default modulation and coding scheme information may be usable to facilitate small data transmission by a user equipment to an NTN node being received and decoded by the NTN node without the user equipment having performed access procedures with the NTN node. For example, an NTN user equipment device, upon determining a reasonably suitable NTN coverage level/signal strength in field 510B using expected coverage level report 240, may transmit latency-stringent traffic, or an emergency message payload, towards tan NTN/satellite $y_2$ corresponding to an associated NTN identifier in field 505B, according to uplink transmission configuration information contained in field 515B.

Expected coverage level report 240 may comprise one or more indications of uplink NTN random access occasion(s)

or random-access NTN resource(s) in random access field 520. Resources indicated in field 520 may be usable by an NTN-capable user equipment to carry potential NTN random access preambles towards an NTN node. For example, information indicated in field 520B may be usable by a user equipment to transmit a random access preamble toward NTN node $y_2$ indicated in field 505B. Indication of random access information in field 520 may facilitate accessing an NTN identified in a corresponding field 505 during a discovery deactivation period at the NTN node, during which deactivation period the NTN node may have halted broadcasting NTN discovery information. Due to the halting of transmission of discovery signal information by the NTN node, NTN-capable user equipment may not be able to determine access information corresponding to the NTN node, even though the node is otherwise active (e.g., the NTN node may have halted broadcasting of a discovery signal but is otherwise operational). Information indicated in field 520 may facilitate a user equipment nevertheless accessing the NTN node that has halted broadcasting discovery signals. Information indicated in field 520 may comprise an indication of resources usable for random access actions with the NTN node indicated in respective field 505 (random access information is part of discovery information that would be broadcast in a discovery signal), thus facilitating an NTN-capable user equipment in being aware of the random access information and thus facilitating the user equipment in accessing the corresponding NTN-node that has halted broadcasting of discovery signal information.

Turning now to FIG. 6, the figure illustrates a timing diagram of an example embodiment method 600. At act 610, TN RAN node 105 may receive inter-frequency measurement reports (e.g., information contained in a discovery signal coverage level report 230 described in reference to FIGS. 2 and 3), from NTN capable WTRU/UE device 115 via uplink messaging. The discovery signal coverage level report may comprise information indicative of received signal coverage levels/signal strengths, as determined by the WTRU/UE 115. At act 615, TN RAN node 105 may receive cell-specific NTN coverage reports comprising information 235 as described in reference to FIG. 4, from an adjacent TN RAN node via backhaul interface links (e.g., XN/2 interface). Information 235 may comprise a cell/TN RAN node identifier indicative of a TN RAN node that transmitted the information 235. Information 235 may comprise minimum or maximum coverage level(s) corresponding to one or more active NTN/satellites that are determined by NTN-capable devices 115 and included in discovery signal coverage reports 230. At act 620, TN RAN node 105 may generate, or compile, an NTN coverage and access report, for example an expected coverage level report 240. An expected coverage level report may comprise an active NTN identifier, indicative of NTN coverage level/signal strengths corresponding to an NTN node associated with the active NTN identifier. An indicated coverage level/signal strength may be a minimum signal strength, an average signal strength, a maximum signal strength, or a prefiltered signal strength corresponding to the NTN node indicated by the NTN identifier. An expected coverage level report may comprise default transmit configuration set information associated with an indicated active NTN node. An expected coverage level report may comprise uplink random access occasion information indications or uplink timing and frequency resource information indication corresponding to one or more active NTN nodes identified in the expected coverage level report. At act 625, TN RAN node 105 may transmit (e.g., via broadcasting, multicasting, or via device-specific signaling) an expected coverage level report to one or more NTN-capable user equipment devices 115. At act 630, TN RAN node 105 may transmit, for example via a gateway interface (e.g., an interface corresponding to gateway 106 shown in FIG. 2) towards an NTN satellite node, a discovery deactivation message that may comprise a respective validity period, which may be referred to as a discovery deactivation period.

Turning now to FIG. 7, the figure illustrates a flow diagram of an example embodiment 700. Method 700 begins at act 705. At act 710, a non-terrestrial network node may broadcast discovery information in a discovery signal. The discovery information, or the discovery signal, may be similar to information transmitted in a synchronization signal block signal transmitted by a ground-based network node. At act 715, a user equipment, which may be configured to communicate with a satellite or non-terrestrial network node, may receive a discovery signal transmitted at act 710 and may determine a coverage level, or signal strength, corresponding to the discovery signal. At act 720, the user equipment configured to communicate with a non-terrestrial network node may transmit a discovery signal coverage level report to a terrestrial network radio access network node. The discovery signal coverage level report transmitted at act 720 may comprise a coverage level, a signal strength, or other information indicative of a coverage level or signal strength determined at act 715.

At act 725, a determination may be made at the terrestrial network node that the terrestrial network node is configured to, or has been instructed to, receive non-terrestrial network node coverage information from another terrestrial network node. If a determination is made at act 725 that the terrestrial network node is not configured to, or has not been instructed to, receive or analyze non terrestrial network node coverage information from in other terrestrial network node, method 700 advances to act 735. If a determination is made at act 725 that a terrestrial network node is configured to, or has been instructed to, receive, analyze, or process non-terrestrial network node coverage information from another terrestrial network node, at act 730 the terrestrial network node may receive non terrestrial network node coverage information from another terrestrial network node.

At act 735, the terrestrial network node may generate an expected coverage level report. The expected coverage level report generated at act 735 may be based on information contained in one or more discovery signal coverage level reports received from one or more user equipment at act 720. In an embodiment, the expected coverage level report generated at act 735 may be based on information contained in one or more discovery signal coverage level reports transmitted at act 720 and coverage information received from another terrestrial network node at act 730. It will be appreciated that coverage information received from another terrestrial network noted act 730 may be based on information contained in one or more discovery signal coverage level reports received from user equipment by the other terrestrial network node.

At act 740, the terrestrial network node may transmit the expected coverage level report generated at act 735 to user equipment that have been designed or configured to communicate with a satellite. At act 745, a satellite corresponding to a non-terrestrial network node may halt transmission of discovery information signaling. For example, the satellite may halt transmission of SSB signals. The non-terrestrial network node may halt transmission of discovery signaling at act 745 based on a configuration, or the non-terrestrial network node may halt transmission of discovery information based on having received a discovery deactivation indication from a terrestrial network node. A discovery deactivation indication may be indicative to the satellite to stop broadcasting discovery information via discovery signaling. A discovery deactivation indication may comprise a discovery deactivation period indication indicative of a discovery deactivation period during which the satellite is to halt the broadcasting of discovery information or a discovery signal.

At act 750, a user equipment that is configured to communicate with a non-terrestrial network node may determine that an expected coverage level indicated in an expected coverage level report corresponding to a non-terrestrial network node that has deactivated transmission of a discovery signal is higher than a coverage level corresponding to a terrestrial radio network node that the user equipment has determined by measuring a discovery signal transmitted by the terrestrial radio note. If a determination is made at act 750 that an expected coverage, or signal strength, corresponding to a non-terrestrial network node that has halted transmission of discovery signaling is not greater than a measured signal strength corresponding to a terrestrial radio network node, method 700 may advance to act 760 and end. If a determination is made at act 750 that an expected coverage level, or signal strength, indicated in an expected coverage level report transmitted act 740 corresponding to a non-terrestrial network node that has halted transmission of discovery signaling is higher than a measured coverage, or signal strength, corresponding to a terrestrial radio network node, method 700 may advance to act 755. At act 755, the user equipment may perform a communication action with the non-terrestrial network node that has halted transmission of discovery signaling according to information contained in the expected coverage level report transmitted at act 740. For example, the user equipment may perform connection establishment with the non-terrestrial radio network node notwithstanding that the user equipment has not detected, or has not measured, a discovery signal transmitted by the non-terrestrial radio network node. In an embodiment, the user equipment may use transmission configuration information contained in an expected coverage level report to transmit a short message to the non-terrestrial radio access network node that has halted broadcasting of discovery signaling. The user equipment may use random access information contained in an expected coverage level report to perform connection establishment with the non-terrestrial radio network node. Thus, during a discovery signal deactivation period, during which a non-terrestrial radio network node has disabled, discontinued, or deactivated, broadcasting of discovery signaling to save energy at the non-terrestrial node, a user equipment that cannot detect or measure discovery signaling from the non-terrestrial radio network node may nevertheless communicate with, or establish a connection with, the non-terrestrial radio network node. Accordingly, the user equipment may experience better service with respect to the non-terrestrial radio network node than the user equipment may be able to achieve with respect to a ground based radio access network node of which the user equipment can actually detect and measure a discovery signal.

Turning now to FIG. 8, the figure illustrates an example embodiment method 800 comprising at block 805 facilitating, by a radio network node comprising at least one processor, receiving, from at least one user equipment, at least one discovery signal coverage level report comprising at least one satellite signal strength indication indicative of at least one signal strength, corresponding to at least one discovery signal associated with at least one satellite, determined by the at least one user equipment; at block 810 based on the at least one discovery signal coverage level report, determining, by the radio network node, an expected coverage level report corresponding to the at least one satellite, comprising at least one expected signal strength indication indicative of at least one expected signal strength corresponding to the at least one satellite; and at block 815 facilitating, by the radio network node, transmitting, to the at least one user equipment, the expected coverage level report.

Turning now to FIG. 9, the figure illustrates an example radio access network node 900, comprising at block 905 a processor configured to process executable instructions that, when executed by the processor, facilitate performance of operations, comprising receiving, from a first user equipment, a first discovery signal coverage level report comprising at least one determined first satellite signal strength indication indicative of at least one first signal strength, determined by the first user equipment, corresponding to a discovery signal that is broadcast by a satellite; at block 910 receiving, from a second user equipment, a second discovery signal coverage level report comprising at least one determined second satellite signal strength indication indicative of at least one second signal strength, determined by the second user equipment, corresponding to the discovery signal; at block 915 based on the first discovery signal coverage level report and the second discovery signal coverage level report, determining an expected coverage level report, corresponding to the satellite, comprising at least one expected signal strength indication indicative of at least one expected signal strength corresponding to the satellite; and at block 920 transmitting, to the first user equipment and the second user equipment, the expected coverage level report.

Turning now to FIG. 10, the figure illustrates a non-transitory machine-readable medium 1000 comprising at block 1005 executable instructions that, when executed by a processor of a radio network node, facilitate performance of operations, comprising receiving, from at least one user equipment, at least one discovery signal coverage level report comprising at least one satellite signal strength indication indicative of at least one signal strength, determined by the at least one user equipment, corresponding to a discovery signal broadcast by a satellite; at block 1010 based on the at least one discovery signal coverage level report, determining an expected coverage level report corresponding to the satellite, comprising at least one expected signal strength indication indicative of at least one expected signal strength corresponding to the satellite; and at block 1015 transmitting, to the at least one user equipment, the expected coverage level report, usable by the at least one user equipment to determine that a communication session is to be established with the radio network node via the satellite.

Figure 11:
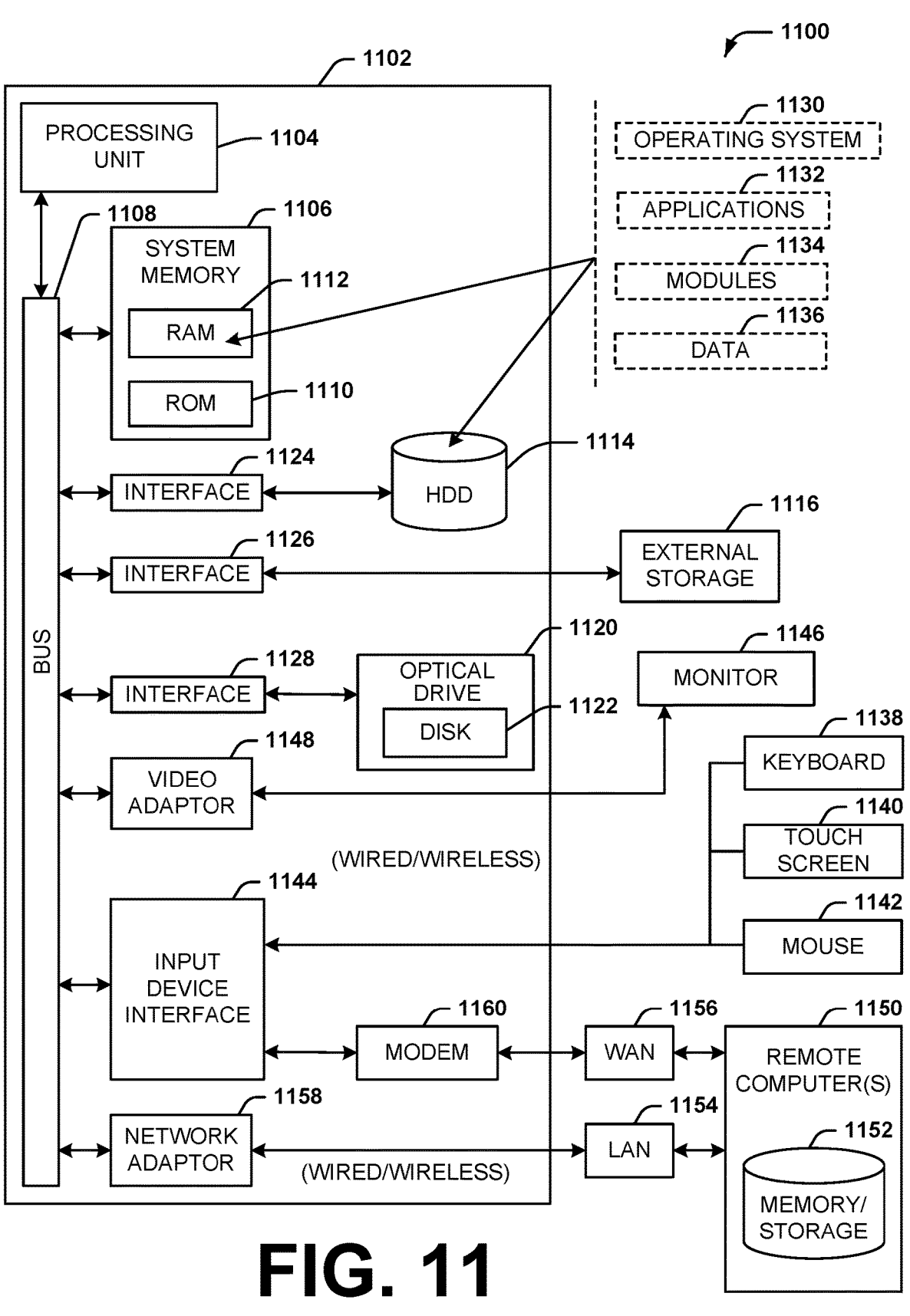
FIG. 11 illustrates an example computer environment.

In order to provide additional context for various embodiments described herein, FIG. 11 and the following discussion are intended to provide a brief, general description of a suitable computing environment 1100 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors and may include a cache memory. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

Computer 1102 further includes an internal hard disk drive (HDD) 1114 (e.g., EIDE, SATA), one or more external storage devices 1116 (e.g., a magnetic floppy disk drive (FDD), a memory stick or flash drive reader, a memory card reader, etc.) and an optical disk drive 1120 (e.g., which can read or write from disk 1122, for example a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1111 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can comprise a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1111 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 12:
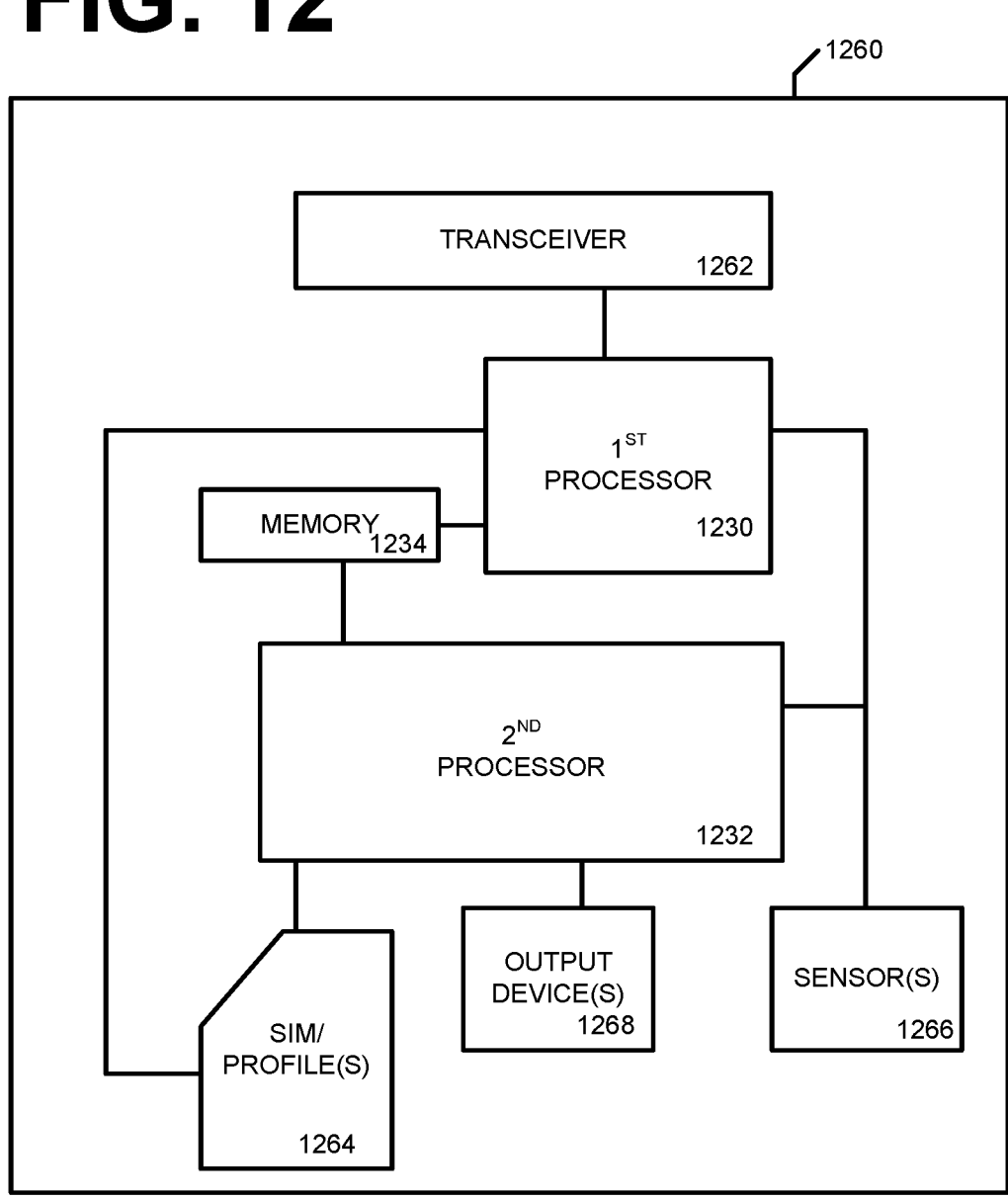
FIG. 12 illustrates a block diagram of an example wireless user equipment.

Turning now to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, an intermediate XR processing unit, and the like. UE 1260 may comprise a first processor 1230, a second processor 1232, and a shared memory 1234. UE 1260 may include radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1262 may comprise multiple sets of circuitry or may be tunable to accommodate different frequency ranges, different modulations schemes, or different communication protocols, to facilitate long-range wireless links such as links 125, device-to-device links, such as links 135, and short-range wireless links, such as links 137.

Continuing with description of FIG. 12, UE 1260 may also include a SIM 1264, or a SIM profile, which may comprise information stored in a memory (memory 1234 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both first processor portion 1230 and second processor portion 1232. Such an implementation may provide an advantage that first processor portion 1230 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or baseband processor, is shown smaller than processor second 1232, which may be a more sophisticated application processor than the first processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need the second processor for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, light sensors, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |

TABLE 1-continued

| Term | Definition |
| --- | --- |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| gNB | General NodeB |
| PUCCH | Physical uplink control channel |
| PUSCH | Physical uplink shared channel |
| SRS | Sounding reference signal |
| NES | Network energy saving |
| QCI | Quality class indication |
| RSRP | Reference signal received power |
| PCI | Primary cell ID |
| BWP | Bandwidth Part |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by a radio network node comprising at least one processor, receiving, from at least one user equipment, at least one discovery signal coverage level report comprising at least one satellite signal strength indication indicative of at least one signal strength, corresponding to at least one discovery signal associated with at least one satellite, determined by the at least one user equipment;

based on the at least one discovery signal coverage level report, determining, by the radio network node, an expected coverage level report corresponding to the at least one satellite, comprising at least one expected signal strength indication indicative of at least one expected signal strength corresponding to the at least one satellite;

facilitating, by the radio network node, transmitting, to the at least one user equipment, the expected coverage level report; and facilitating, by the radio network node, transmitting, to at least one of the at least one satellite, a discovery deactivation message comprising a discovery deactivation indication indicative to the at least one satellite to stop broadcasting the at least one discovery signal.

2. The method of claim 1, wherein the discovery deactivation message further comprises a discovery deactivation period indication indicative of a discovery deactivation period during which the at least one satellite is to halt broadcasting the at least one discovery signal.

3. The method of claim 2, wherein the at least one discovery signal comprises synchronization signal block information.

4. The method of claim 2, wherein the expected coverage level report comprises access information usable by the at least one user equipment to establish a connection with the at least one satellite during the discovery deactivation period.

5. The method of claim 2, wherein the expected coverage level report comprises default transmission configuration information usable by the at least one user equipment to: avoid establishing a communication session with the at least one satellite and transmit, to the at least one satellite, a data transmission.

6. The method of claim 5, wherein the data transmission comprises at least one of: at least one traffic protocol data unit corresponding to a latency-stringent traffic flow, or at least one emergency protocol data unit corresponding to an emergency message.

7. The method of claim 1, wherein a first discovery signal coverage level report of the at least one discovery signal coverage level report is received from a first user equipment of the at least one user equipment, wherein a second discovery signal coverage level report of the at least one discovery signal coverage level report is received from a second user equipment of the at least one user equipment, wherein the first discovery signal coverage level report comprises a first satellite signal strength indication, of the at least one satellite signal strength indication, indicative of a first signal strength of the at least one signal strength, corresponding to a first discovery signal of the at least one discovery signal associated with a first satellite of the at least one satellite, wherein the second discovery signal coverage level report comprises a second satellite signal strength indication of the at least one satellite signal strength indication, indicative of a second signal strength of the at least one signal strength, corresponding to a second discovery signal of the at least one discovery signal associated with a second satellite of the at least one satellite, wherein the expected coverage level report comprises a first expected signal strength indication of the at least one expected signal strength indication indicative of a first expected signal strength of the at least one expected signal strength corresponding to the first satellite, and wherein the expected coverage level report comprises a second expected signal strength indication of the at least one expected signal strength indication indicative of a second expected signal strength of the at least one expected signal strength corresponding to the second satellite.

8. The method of claim 1, wherein a first discovery signal coverage level report of the at least one discovery signal coverage level report is received from a first user equipment of the at least one user equipment, wherein a second discovery signal coverage level report of the at least one discovery signal coverage level report is received from a second user equipment of the at least one user equipment, wherein the first discovery signal coverage level report comprises a first satellite signal strength indication of the at least one satellite signal strength indication, indicative of a first signal strength of the at least one signal strength, corresponding to a first discovery signal of the at least one discovery signal associated with a first satellite of the at least one satellite, wherein the second discovery signal coverage level report comprises a second satellite signal strength indication of the at least one satellite signal strength indication, indicative of a second signal strength of the at least one signal strength, corresponding to a second discovery signal of the at least one discovery signal associated with the first satellite, and wherein the at least one expected signal strength indication is determined based on the first signal strength and the second signal strength.

9. The method of claim 1, wherein the radio network node is a first radio network node, wherein the expected coverage level report is a first expected coverage level report, wherein the at least one expected signal strength indication is a first expected signal strength indication indicative of a first expected signal strength of the at least one expected signal strength, and the method further comprising:

facilitating, by the first radio network node, receiving, from a second radio network node, a second expected coverage level report corresponding to the at least one satellite, comprising a second expected signal strength indication of the at least one expected signal strength indication indicative of a second expected signal strength of the at least one expected signal strength corresponding to the at least one satellite;

wherein the first expected coverage level report is further determined based on the second expected coverage level report.

10. The method of claim 1, wherein the radio network node is a first radio network node, wherein the expected coverage level report is a first expected coverage level report, wherein the at least one expected signal strength indication is a first expected signal strength indication indicative of a first expected signal strength of the at least one expected signal strength, and the method further comprising:

facilitating, by the first radio network node, transmitting, to a second radio network node, the first expected coverage level report to be usable by the second radio network node to determine a second expected coverage level report corresponding to the at least one satellite, based on a second expected signal strength indication of the at least one expected signal strength indication indicative of a second expected signal strength of the at least one expected signal strength corresponding to the at least one satellite, wherein the first expected coverage level report is further determined based on the second expected signal strength indication.

11. The method of claim 1, wherein the at least one expected signal strength indication comprises a minimum expected signal strength corresponding to the at least one satellite and a maximum expected signal strength corresponding to the at least one satellite.

12. The method of claim 1, wherein the radio network node is a ground-based radio access network node and wherein the at least one satellite is part of at least one non-terrestrial network node.

13. The method of claim 1, wherein the radio network node comprises at least one non-terrestrial network base station that corresponds to the satellite.

14. A radio access network node, comprising:

a processor configured to process executable instructions that, when executed by the processor, facilitate performance of operations, comprising:

receiving, from a first user equipment, a first discovery signal coverage level report comprising at least one determined first satellite signal strength indication indicative of at least one first signal strength, determined by the first user equipment, corresponding to a discovery signal that is broadcast by a satellite;

receiving, from a second user equipment, a second discovery signal coverage level report comprising at least one determined second satellite signal strength indication indicative of at least one second signal strength, determined by the second user equipment, corresponding to the discovery signal;

based on the first discovery signal coverage level report and the second discovery signal coverage level report, determining an expected coverage level report, corresponding to the satellite, comprising at least one expected signal strength indication indicative of at least one expected signal strength corresponding to the satellite to result in a determined expected coverage level report, wherein the radio access network node is a first radio access network node, wherein the at least one expected signal strength indication is a first expected signal strength indication indicative of a first expected signal strength of the at least one expected signal strength, and wherein the operations further comprise:

receiving, from a second radio access network node, at least one received expected coverage level report corresponding to the satellite, comprising a second expected signal strength indication of the at least one expected signal strength indication indicative of a second expected signal strength of the at least one expected signal strength corresponding to the satellite, wherein the determined expected coverage level report is further determined based on the at least one received expected coverage level report; and transmitting, to the first user equipment and the second user equipment, the determined expected coverage level report.

15. The radio access network node of claim 14, wherein the operations further comprise:

transmitting, to the satellite, a discovery deactivation message comprising a discovery deactivation indication indicative to the satellite to halt broadcasting of the discovery signal during a discovery deactivation period.

16. The radio access network node of claim 15, wherein the at least one expected signal strength indication is usable by the first user equipment or the second user equipment to establish communication with the satellite during the discovery deactivation period.

17. The radio access network node of claim 15, wherein the determined expected coverage level report comprises access information usable by at least one of the first user equipment or the second user equipment to establish a connection with the satellite during the discovery deactivation period.

18. A non-transitory machine-readable medium, comprising executable instructions that, when executed by a processor of a radio network node, facilitate performance of operations, comprising:

receiving, from at least one user equipment, at least one discovery signal coverage level report comprising at least one satellite signal strength indication indicative of at least one signal strength, determined by the at least one user equipment, corresponding to a discovery signal broadcast by a satellite;

based on the at least one discovery signal coverage level report, determining an expected coverage level report corresponding to the satellite, comprising at least one expected signal strength indication indicative of at least one expected signal strength corresponding to the satellite;

transmitting, to the at least one user equipment, the expected coverage level report, usable by the at least one user equipment to determine that a communication session is to be established with the radio network node via the satellite; and transmitting to the satellite a discovery deactivation indication indicative to the at least one satellite to stop broadcasting of the discovery signal during a discovery deactivation period.

19. The non-transitory machine-readable medium of claim 18, wherein the discovery signal comprises synchronization signal block information, and wherein the expected coverage level report is usable by the at least one user equipment to determine to establish a communication session with the radio network node via the satellite during the discovery deactivation period.

20. The non-transitory machine-readable medium of claim 18, wherein the radio network node comprises at least one of: at least one terrestrial radio access network node or at least one non-terrestrial network base station that corresponds to the satellite.

* * * * *